US009602221B2

(12) United States Patent
Weinzierl et al.

(10) Patent No.: US 9,602,221 B2
(45) Date of Patent: Mar. 21, 2017

(54) WIRELESS ULTRASONIC DATA TRANSMISSION FOR EXPLOSIVE ENVIRONMENTS

(71) Applicant: Zackat, Inc., The Colony, TX (US)

(72) Inventors: Mark A. Weinzierl, Frisco, TX (US); Scott D. Constien, Plano, TX (US); Chek S. Poh, Garland, TX (US)

(73) Assignee: ZACKAT, INC., The Colony, TX (US)

( * ) Notice: Subject to any disclaimer, the term of this patent is extended or adjusted under 35 U.S.C. 154(b) by 216 days.

(21) Appl. No.: 14/657,741

(22) Filed: Mar. 13, 2015

(65) Prior Publication Data

US 2015/0270909 A1 Sep. 24, 2015

Related U.S. Application Data

(60) Provisional application No. 61/968,138, filed on Mar. 20, 2014.

(51) Int. Cl.
*H04B 11/00* (2006.01)
*G08B 25/01* (2006.01)
*G10K 11/18* (2006.01)
*G08B 21/16* (2006.01)
*G08B 25/00* (2006.01)
*G08B 1/08* (2006.01)

(52) U.S. Cl.
CPC ............. *H04B 11/00* (2013.01); *G08B 21/16* (2013.01); *G08B 25/009* (2013.01); *G10K 11/18* (2013.01); *G08B 1/08* (2013.01)

(58) Field of Classification Search
CPC ........ H04B 11/00; G08B 25/009; G08B 1/08; G08B 21/16; G10K 11/18
See application file for complete search history.

(56) References Cited

U.S. PATENT DOCUMENTS

2013/0242703 A1* 9/2013 Zlotnick ................ H04B 13/02
367/135
2015/0270909 A1* 9/2015 Weinzierl ............... H04B 11/00
367/137

* cited by examiner

*Primary Examiner* — Daniel Pihulic
(74) *Attorney, Agent, or Firm* — Andrews Kurth Kenyon LLP; Sean S. Wooden

(57) ABSTRACT

A system for data transmission for an explosive environment comprises an ultrasonic transmitter coupled to a Class 1 device disposed inside an explosive risk zone and adapted to generate an electric signal in response to a predetermined condition, the ultrasonic transmitter being configured to generate and transmit an ultrasonic signal in response to receiving the electric signal, an ultrasonic receiver disposed outside the explosive risk zone configured to receive the ultrasonic signal, and an uplink communication device adapted to communicate an alert to a remote operator in response to the ultrasonic receiver receiving the ultrasonic signal.

19 Claims, 3 Drawing Sheets

WIRELESS ULTRASONIC DATA TRANSMISSION FOR EXPLOSIVE ENVIRONMENTS

RELATED APPLICATION

This patent application claims the benefit of U.S. Provisional Patent Application No. 61/968,138 filed on Mar. 20, 2014.

FIELD

This disclosure primarily relates to a wireless ultrasonic data transmission system and method for explosive environments.

BACKGROUND

Sensors such as float switches, pressure sensors, gas vapor sensors, etc. that operate within highly explosive environments that contain flammable gases, vapors, or dust with oxygen contained in the surrounding air are subject to very stringent design and certification requirements. The housing containing the electronic devices and circuitry must meet Class 1 Division 1 standards. These housing are typically constructed from solid metal capable of withstanding an internal explosion. Small openings cut or drilled into the housing are subject to very tight design constraints and add considerable cost to implementation. The design is further complicated if wireless communication to the electronics inside the housing is needed. Electromagnetic signals cannot penetrate the metal housing and specially designed Class 1 Division 1 antennas are extremely expensive.

DETAILED DESCRIPTION

The disclosure is directed to a system and method 10 for relaying data using ultrasonic transmission for an explosive environment, such as oil and natural gas wells, petroleum refineries, gasoline storage and dispensing areas, dry cleaning plants, utility gas plants and storage areas. These hazardous environments are typically classified as Class I Division 1 locations. Class 1 is defined as a locale that may have flammable vapors and gases present. The system and method described herein are also applicable to Class II locations where combustible dust may be found, and other hazardous environments. Division 1 is defined as an environment in which ignitable concentrations of hazards exists under normal operation conditions and/or where hazard is caused by frequent maintenance or repair work or frequent equipment failure.

Figure 1:
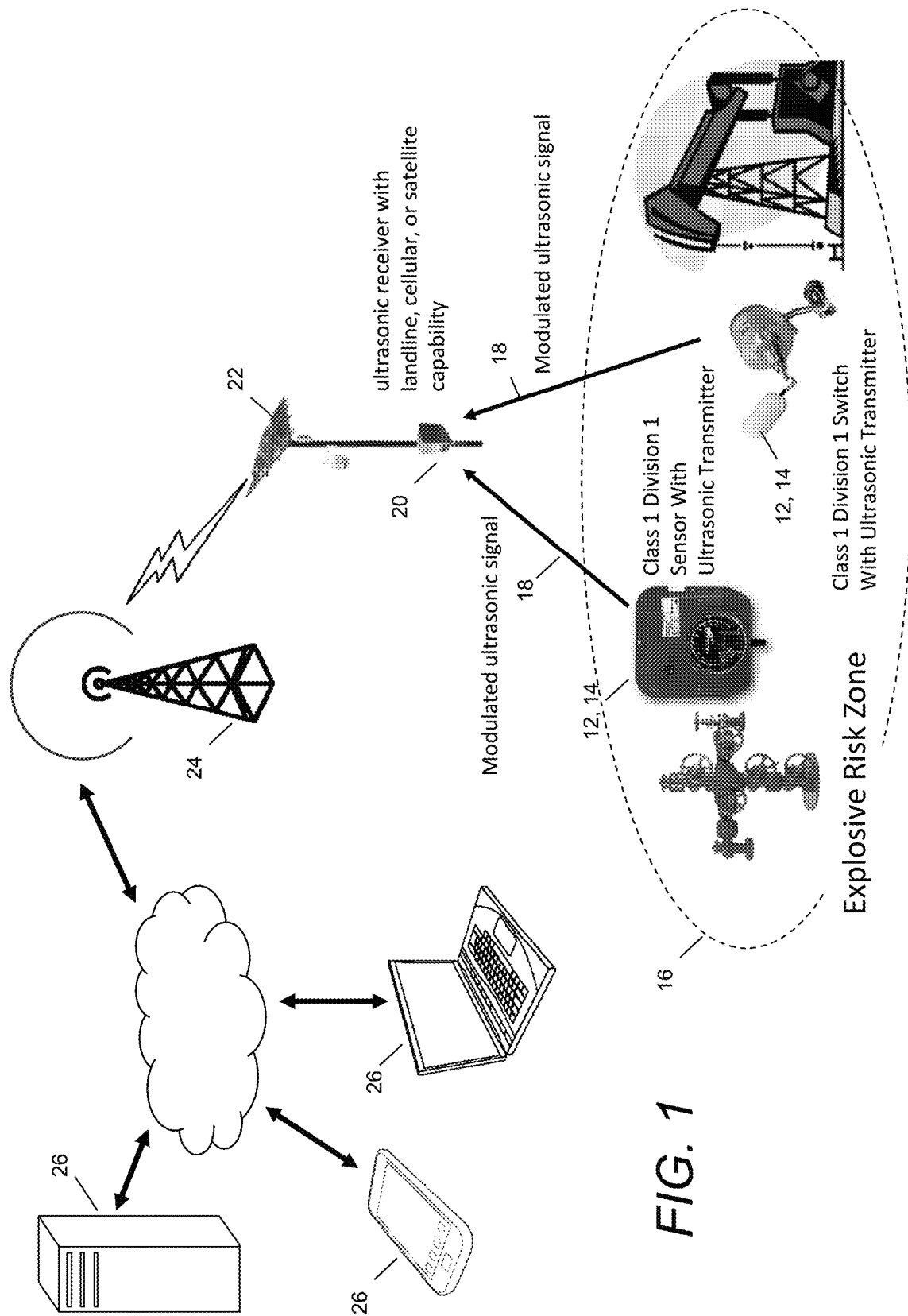
FIG. 1 is a simplified block diagram of an exemplary embodiment of the system and method for wireless ultrasonic data transmission for explosive environments according to the present disclosure.

While electromagnetic signals cannot penetrate a metal housing that meets Class 1 Division 1 standards, this design solution proposes using an intermediate wireless communication transport that can. As shown in FIG. 1, one or more ultrasonic transmitters 12 are coupled to one or more sensors 14 (e.g., float switches, pressure sensors, and gas vapor sensors) inside an explosive risk zone 16. Upon activation or triggering a predetermined condition, for example, detection of the presence of a certain substance, a measured fluid level exceeding a predetermined threshold, or a sensed pressure exceeding a predetermined setting, the ultrasonic transmitter 12 turns on and sends an ultrasonic signal 18 that is detected by an ultrasonic receiver 20 placed outside the explosive risk zone 16. The ultrasonic signal 18 may include data according to a predetermined format and protocol. The data may further include an identifier that uniquely identifies the sensor or ultrasonic transmitter that triggered the transmission. Multiple sensors can be uniquely identified using a number of methods such as modulation techniques, such as AM (Amplitude Modulation), FM (Frequency Modulation), FSK (Frequency-Shift Keying), PM (Phase Modulation), SSB (Single-Sideband Modulation), VSB (Vestigial Sideband Modulation), or QAM (Quadrature Amplitude Modulation) may be used. In an exemplary embodiment, each unique sensor or sensor type is identified by varying the modulation rate using Amplitude Modulation.

Ultrasonic signals have a limited range. For this reason the ultrasonic receiver 20 is placed just outside the explosive risk zone 16. The ultrasonic receiver 20 detects and decodes the ultrasonic signal sent by the ultrasonic transmitter 12 inside the explosive risk zone 16. The ultrasonic receiver 20 is further coupled to a conventional wireless transceiver 22 (housed within a box commonly referred to the as the Bridge) that can retransmit the received sensor data using one or more conventional wireless methods such as cellular (GSM, 3G, 4G, CDMA, LTE, etc.) or satellite communications. Other forms of wireless communications are contemplated herein, such as WiFi, infrared, Bluetooth, etc. Similarly, the ultrasonic receiver 20 may be coupled to wired communication means, such as a landline, Local Area Network, Wide Area network, etc. Future wireless and wired communication protocols and methods are also contemplated.

As shown in FIG. 1, the wireless transceiver 22 is configured to communicate with a base station, eNodeB (also known as a cell tower) 24, which may communicate the sensor data to a remote monitor or operator 26 (illustrated by a mobile telephone, laptop computer, and server) via the telecommunication network and Internet.

Figure 2:
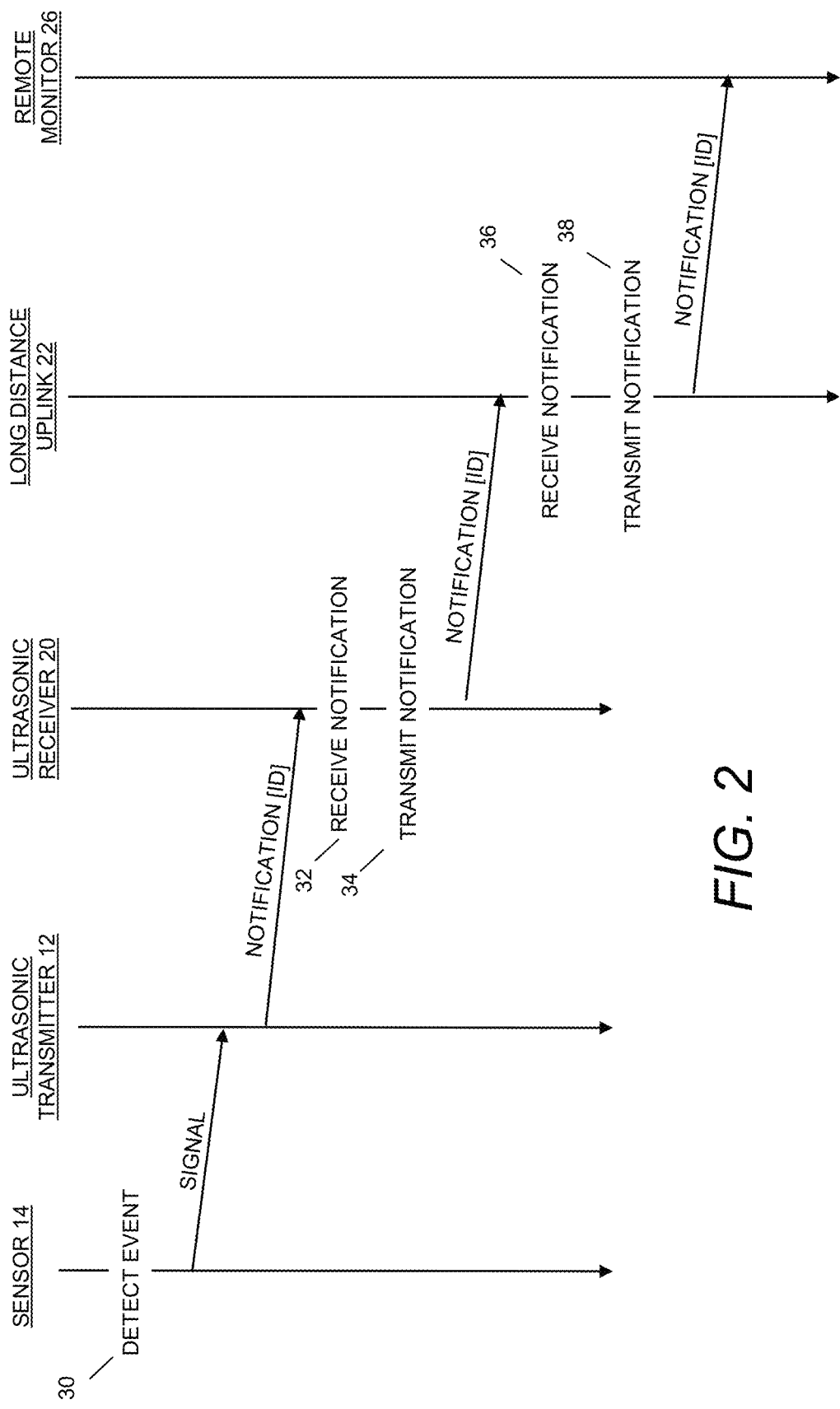
FIG. 2 is a simplified data flow diagram of an exemplary embodiment of the system and method for wireless ultrasonic data transmission for explosive environments according to the present disclosure.

FIG. 2 is a simplified data flow diagram of an exemplary embodiment of the system and method for wireless ultrasonic data transmission for explosive environments according to the present disclosure. The Class 1 Division 1 sensor 14 detects a predetermined condition, such as the presence of a substance, a fluid level exceeding a preset threshold, a temperature rising above a limit, a fluid pressure being greater than a set point, etc., and generates an electrical signal in response to the detected condition (indicated by numeral 30). The electrical sensor signal is received by an ultrasonic transmitter 12 that transmits an ultrasonic signal. The ultrasonic signal may be modulated to convey an identifier that uniquely identifies the sensor that triggered the transmission. The ultrasonic signal is meant for transmission over a short distance to an ultrasonic receiver 20 located just outside of the explosive risk zone. The ultrasonic receiver 20 receives the ultrasonic notification and transmits the notification to an uplink communication device 22 (indicated by numerals 32 and 34). The uplink communication device 22 in turn receives the notification and transmits the notification to a remote monitor or operator (indicated by numerals 36 and 38).

Figure 3:
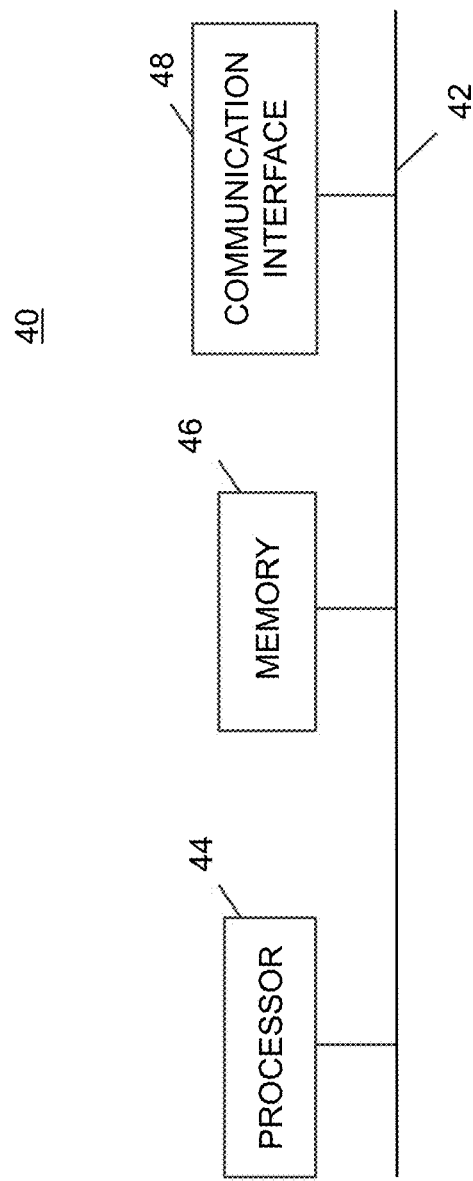
FIG. 3 is a simplified block diagram of an exemplary embodiment of a component in the system and method for wireless ultrasonic data transmission for explosive environments according to the present disclosure.

FIG. 3 is a simplified block diagram of an exemplary embodiment of an exemplary device or component 40 in the system and method for wireless ultrasonic data transmission for explosive environments according to the present disclosure. For example, the ultrasonic transmitter and/or receiver may be implemented as shown in FIG. 3. The device 40 may include a bus 42 or electrical pathway that interconnects a controller or processor 44, a memory 46, and a communication interface 48. The bus 42 enables communication among the various components of device 40. The processor 44 may include one or more processing units or microprocessors that interpret and execute coded instructions. In other implementations, the processor 44 may be implemented by or include one or more application-specific integrated circuits (ASICs), field programmable gate arrays (FPGAs), or the like.

The memory 46 may include a random access memory (RAM) or another type of dynamic storage device that stores information and instructions for execution by the processor 44. The memory 46 may also include a read-only memory (ROM) or another type of static storage device that stores static information and instructions for the processor 44. The memory 46 may further include other types of magnetic or optical recording medium and its corresponding drive for storing information and/or instructions. As used herein, the term "memory" is broadly to include registers, buffers, and other data constructs configured to hold data.

The communication interface 48 may include protocol stacks for processing data transmitted via a data protocol now know or to be developed. The communication interface 48 may include multi-band antenna and transceiver devices that enables the device 40 to communicate via across wide bands of radio frequency with other devices and/or systems. The communication interface 48 may further include interfaces, ports, or connectors to other devices.

As described herein, the device 40 may perform certain operations in response to the processor 44 executing custom and specialized software instructions contained in a computer-readable medium, such as memory 46. A computer-readable medium may be defined as a physical or logical memory device. A logical memory device may include memory space within a single physical memory device or spread across multiple physical memory devices. The custom software instructions may be downloaded from the Internet, read into memory 46 from another computer-readable medium, or from another device via a communication interface 48. The specialized software instructions contained in the memory 46 may cause the processor 44 to perform specialized processes described herein. Alternatively, hardwired circuitry may be used in place of or in combination with software instructions to implement processes described herein. Thus, implementations described herein are not limited to any specifically required combination of hardware circuitry and software.

The concept described in this disclosure is applicable to any situation where there is a defined explosive risk zone of relatively limited size. For example, in an application monitoring pump jacks in oilfield operations, the ultrasonic data transmission may be used to relay important equipment and operational status information. It is vital to monitor the pumps for leaks or spills as well as high or low pressure situations. The conventional practice relies on frequent human inspection or to route the electrical sensor signals through a conduit designed to be compliant with explosive zone requirements. Such conduit designs and implementation are extremely costly.

In an exemplary deployment of the concept disclosed herein, an ultrasonic transmitter 12 is placed within a float switch to detect a spill in the pump jack. It is also possible to put another transmitter within an over-and-under pressure sensor. When an alarm situation is tripped, a cellular bridge located outside the explosive risk zone receives the alarm condition from the ultrasonic receiver 20, and determine what type of sensor device has been tripped (e.g., spill or pressure) and sends an alert vial cellular communication in the form of a text message to a backend system or web-based application, which may further relay the text message alert to a pump operator or other personnel via a variety of computing devices such as computer server, laptop computer, and smart mobile telephones, etc. The text message preferably contains the type of triggered alert, the time (timestamp of the sensed condition) and location, and other related data. Other forms of communication now known or future implemented (e.g., email, mobile call) to alert operator personnel are also contemplated.

The features of the present invention which are believed to be novel are set forth below with particularity in the appended claims. However, modifications, variations, and changes to the exemplary embodiments described above will be apparent to those skilled in the art, and the wireless ultrasonic data transmission for explosive environments described herein thus encompasses such modifications, variations, and changes and are not limited to the specific embodiments described herein.

What is claimed is:

1. A system for data transmission for an explosive environment comprising:
   an ultrasonic transmitter coupled to a Class 1 device disposed inside an explosive risk zone and adapted to generate an electric signal in response to a predetermined condition, the ultrasonic transmitter being configured to generate and transmit an ultrasonic signal in response to receiving the electric signal;
   an ultrasonic receiver disposed outside the explosive risk zone configured to receive the ultrasonic signal; and
   an uplink communication device adapted to communicate an alert to a remote operator in response to the ultrasonic receiver receiving the ultrasonic signal.

2. The system of claim 1, wherein the ultrasonic transmitter is further configured to modulate the ultrasonic signal to encode data identifying a particular Class 1 device.

3. The system of claim 2, further comprising a backend system configured to receive the alert from the uplink communication device, and transmit a text message to the remote operator.

4. The system of claim 3, wherein the backend system is adapted to identify the Class 1 device and transmit location, type, and time information to the remote operator.

5. The system of claim 1, wherein the Class 1 device comprises a Class 1 Division 1 device selected from the group consisting of pressure sensor, float switch, level sensor, temperature sensor, and gas vapor sensor.

6. The system of claim 1, wherein the uplink communication device is selected from the group consisting of cellular communication device, satellite communication device, and landline telecommunications device.

7. A method for data transmission for an explosive environment comprising:
   receiving a signal from a Class 1 device disposed inside an explosive risk zone;

generating and transmitting, at an ultrasonic transmitter disposed inside the explosive risk zone, an ultrasonic signal identifying the Class 1 device; and receiving, at an uplink communication device disposed outside the explosive risk zone, the ultrasonic signal and transmitting an alert to a remote operator in response to receiving the ultrasonic signal.

8. The method of claim 7, wherein generating and transmitting the ultrasonic signal further comprises modulating the signal to include identifying information.

9. The method of claim 7, wherein transmitting an alert comprises communicating with a cellular base station.

10. The method of claim 7, wherein transmitting an alert comprises communicating with a satellite.

11. The method of claim 7, wherein transmitting an alert comprises communicating with a landline telecommunication device.

12. The method of claim 7, wherein receiving the signal from the Class 1 device is in response to a predetermined condition being detected.

13. The method of claim 7, further comprising receiving the alert from the uplink communication device, and transmitting a text message to the remote operator.

14. A system for transmitting data associated with a sensor disposed inside an explosive risk zone comprising:

an ultrasonic transmitter coupled to the sensor, the ultrasonic transmitter being configured to generate and transmit an ultrasonic signal in response to receiving an electric signal generated by the sensor in response detection of a predetermined condition;

an ultrasonic receiver disposed outside an explosive risk zone configured to receive the ultrasonic signal; and a communication device coupled to the ultrasonic receiver and configured to generate and transmit an alert to a remote operator in response to the ultrasonic receiver receiving the ultrasonic signal.

15. The system of claim 14, wherein the ultrasonic transmitter is further configured to modulate the ultrasonic signal to encode data identifying a particular sensor.

16. The system of claim 14, further comprising a backend system configured to receive the alert from the communication device, and generate and transmit a text message to the remote operator.

17. The system of claim 15, wherein the backend system is configured to generate and transmit a text message including sensor type, location, and timestamp information to the remote operator.

18. The system of claim 14, wherein the sensor comprises a Class 1 Division 1 device selected from the group consisting of pressure sensor, temperature sensor, float switch, level sensor, and gas vapor sensor.

19. The system of claim 14, wherein the communication device is selected from the group consisting of cellular communication device, satellite communication device, and landline telecommunications device.

* * * * *